(12) United States Patent
Mandalapu et al.

(10) Patent No.: US 8,656,305 B2
(45) Date of Patent: Feb. 18, 2014

(54) ADAPTIVE USER INTERFACE ELEMENTS

(75) Inventors: Dinesh Mandalapu, Karnataka (IN); Rahul Ajmera, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 299 days.

(21) Appl. No.: 12/782,724

(22) Filed: May 19, 2010

(65) Prior Publication Data

US 2011/0246905 A1    Oct. 6, 2011

(30) Foreign Application Priority Data

Apr. 6, 2010   (IN) .............................. 955/CHE/2010

(51) Int. Cl.
*G06F 3/048* (2013.01)
(52) U.S. Cl.
USPC ............................ 715/809; 715/755; 715/813
(58) Field of Classification Search
CPC ...................................................... G06F 3/048
USPC .................................. 715/714, 745, 809, 813
See application file for complete search history.

(56) References Cited

U.S. PATENT DOCUMENTS

| | | | |
|---|---|---|---|
| 6,823,343 B2 | 11/2004 | Arrouye et al. | |
| 2003/0088831 A1* | 5/2003 | Bauer et al. | 715/516 |
| 2004/0039934 A1* | 2/2004 | Land et al. | 713/200 |
| 2004/0153973 A1 | 8/2004 | Horwitz | |
| 2005/0012965 A1* | 1/2005 | Bloomfield | 358/402 |
| 2006/0009264 A1* | 1/2006 | Seo et al. | 455/563 |
| 2006/0288004 A1* | 12/2006 | Toriyama | 707/6 |
| 2008/0082943 A1* | 4/2008 | Chung et al. | 715/835 |
| 2008/0141123 A1* | 6/2008 | Kitada | 715/255 |
| 2008/0174570 A1* | 7/2008 | Jobs et al. | 345/173 |
| 2008/0184290 A1* | 7/2008 | Tapuska | 725/37 |
| 2008/0307341 A1 | 12/2008 | Ferry et al. | |
| 2008/0316171 A1* | 12/2008 | Shahoian et al. | 345/158 |
| 2009/0007192 A1* | 1/2009 | Singh | 725/75 |
| 2009/0030697 A1* | 1/2009 | Cerra et al. | 704/275 |
| 2009/0037623 A1* | 2/2009 | Ghassabian | 710/67 |
| 2009/0055739 A1 | 2/2009 | Murillo et al. | |
| 2009/0094555 A1 | 4/2009 | Viitala | |
| 2009/0307579 A1* | 12/2009 | Gelman et al. | 715/229 |
| 2009/0322790 A1* | 12/2009 | Behar et al. | 345/659 |
| 2010/0146393 A1* | 6/2010 | Land et al. | 715/723 |
| 2010/0180197 A1* | 7/2010 | Ohashi | 715/256 |
| 2010/0185448 A1* | 7/2010 | Meisel | 704/256.1 |
| 2011/0169731 A1* | 7/2011 | Takenaka et al. | 345/157 |

OTHER PUBLICATIONS

Wolff et al.; Linking GUI Elements to Tasks-supporting an Evolutionary Design Process. © 2005; ACM; 8 pages.*
Brusilovsky et al.; User as Student: Towards an Adaptive Interface for Advanced Web-Based Applications; © 1997; New York; 12 pages.*

* cited by examiner

*Primary Examiner* — Linh K Pham

(57) ABSTRACT

Presented is a method of adapting user interface elements. The method includes identifying state of a computer application, adapting one or more user interface elements associated with the computer application based on the state of the computer application, and displaying the one or more user interface elements.

13 Claims, 6 Drawing Sheets

300

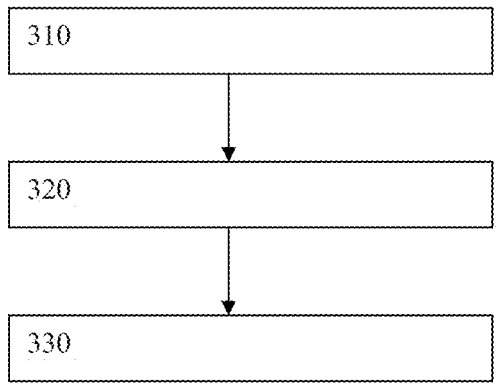
FIG. 3    300
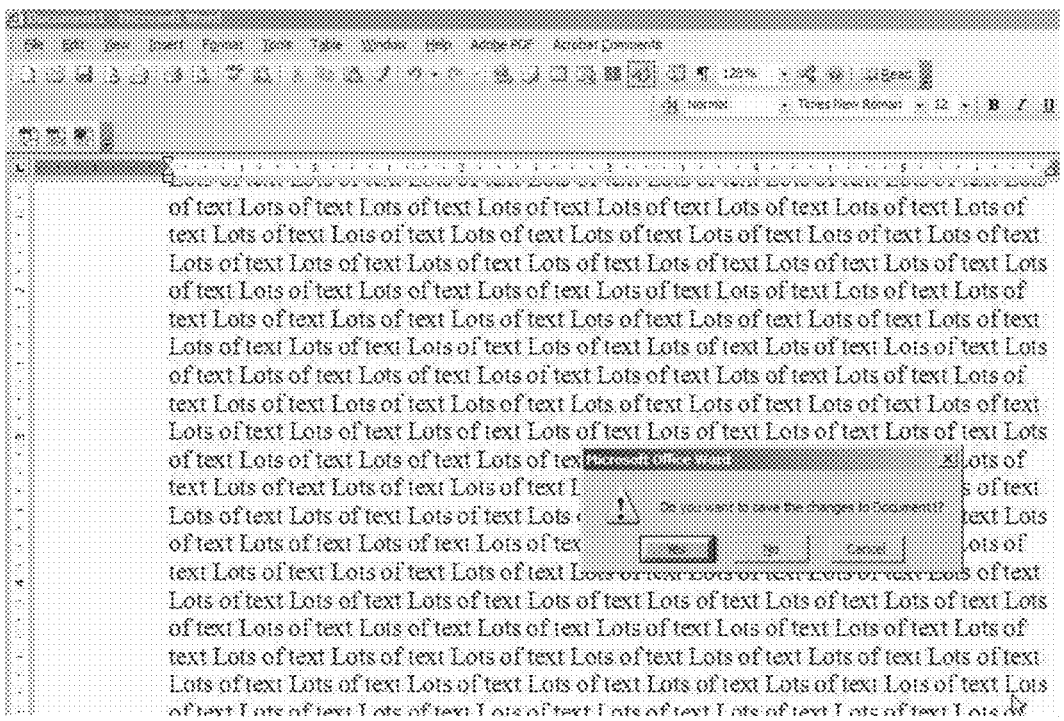
FIG. 4

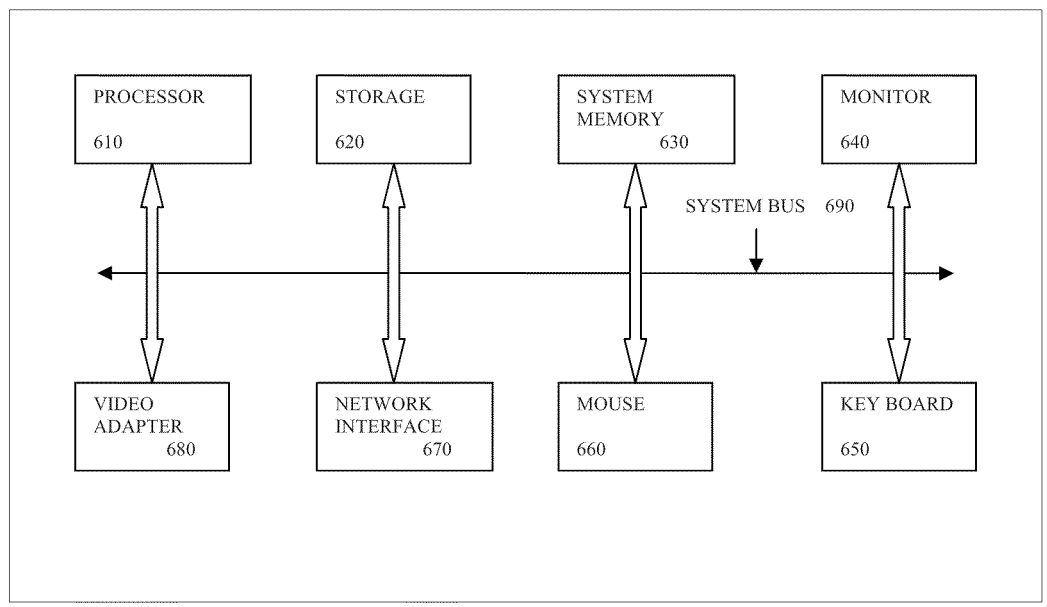
FIG. 6        600

ADAPTIVE USER INTERFACE ELEMENTS

RELATED APPLICATIONS

Benefit is claimed under 35 U.S.C. 119(a)-(d) to Foreign application Serial No. 955/CHE/2010 entitled "ADAPTIVE USER INTERFACE ELEMENTS" by Hewlett-Packard Development Company, L.P., filed on 6 Apr. 2010, which is herein incorporated in its entirety by reference for all purposes.

BACKGROUND

Human-computer interaction has evolved considerably over the past few decades. From the days when people used to enter machine code or commands into computers to perform a task, the human-computer user interface has touched a new paradigm with multi-modal interface now beginning to be the norm. However, a graphical user interface (GUI) with its associated interface elements still continues to be a preferred mode of interaction for most people. A GUI-based human-computer interaction has had a tremendous impact on usage of personal computers, such as desktops, laptops and mobile handsets. A GUI based approach has not only made it easier for an average user to interact with a computer, but also expanded the reach of personal computers to millions of users all over the world.

Typical examples of GUI-based computer applications include MS Word, MS Excel, Mozilla Firefox, Yahoo Messenger, Google Talk, etc. Most users of personal computers are familiar with these and other GUI-based applications. However, in spite of its widespread usage, a GUI-based computer interaction has certain limitations. The proposed invention provides a solution to some of those limitations.

BRIEF DESCRIPTION OF THE DRAWINGS

For a better understanding of the invention, embodiments will now be described, purely by way of example, with reference to the accompanying drawings, in which:

FIG. 3 shows a flow chart of a computer-implemented method of adapting a user interface element according to an embodiment.

FIG. 4 is a screenshot of a user interface element in a GUI-based computer application according to an embodiment.

FIG. 6 shows a block diagram of a computer system upon which an embodiment may be implemented.

DETAILED DESCRIPTION OF THE INVENTION

A graphical user interface (GUI) is typically in the form of graphical icons and other kinds of visual indicators which aid in human-computer interaction. A GUI is generally a collection of different user interface elements. For example, a simple Windows-based application may have many interface elements like—tool bar buttons, menu commands, dialog box controls, drop down lists, close, maximize and minimize buttons etc. These user interface elements vastly simplify selection and execution of a task related to a computer application. For example, a print icon on a toolbar of a computer application makes it easier for a user to print a document.

Figure 1A:
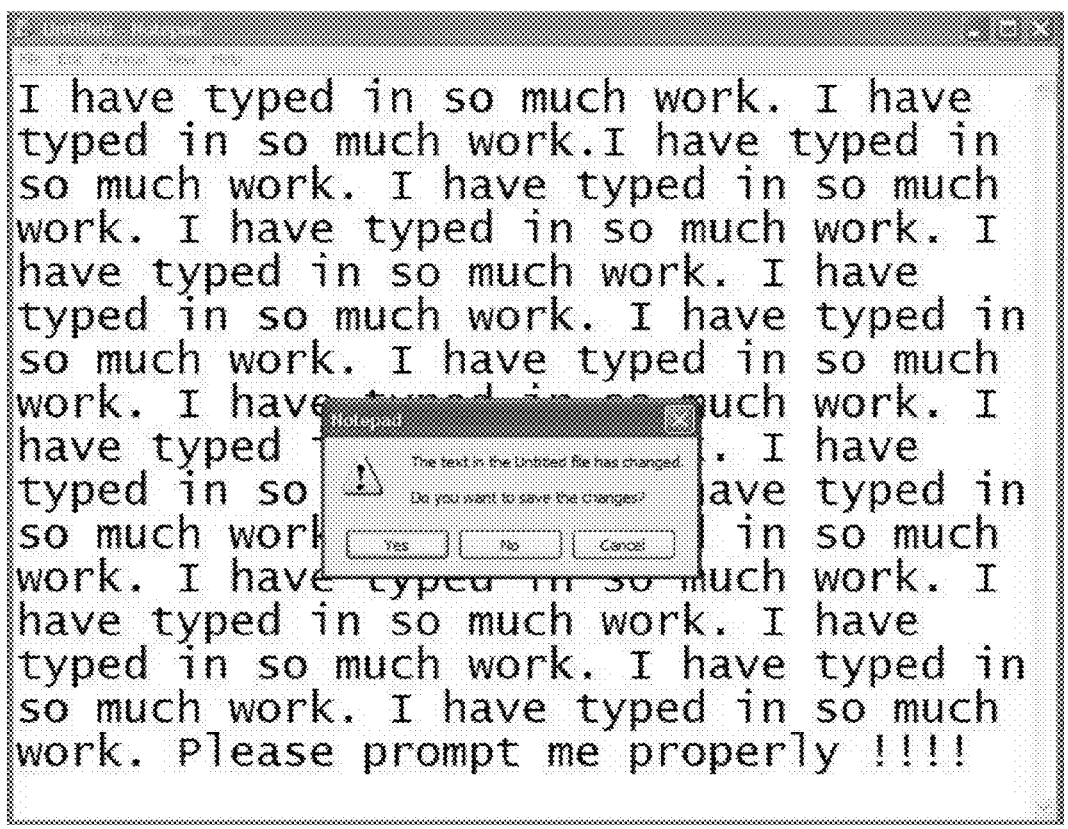
FIGS. 1A and 1B are screenshots of a user interface element in a GUI-based computer application according to prior art.
Figure 1B:
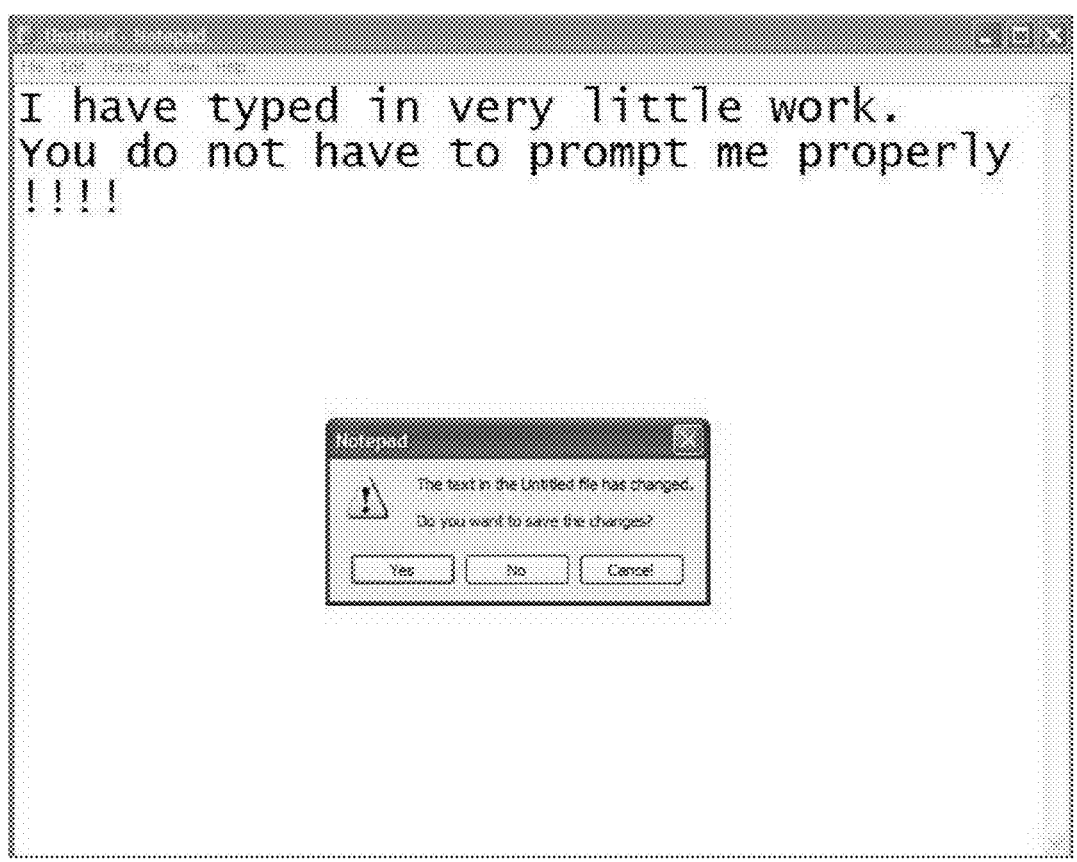

However, one significant limitation with the appearance of user interface elements, in existing computer applications, is their static nature and their interaction behavior, which remains the same regardless of the context in which the computer application is being used. These interface elements are insensitive to their context. FIGS. 1A and 1B illustrate one such example of the static nature of a user interface element.

FIGS. 1A and 1B provide screenshots of a user interface element in a GUI-based computer application according to prior art. FIG. 1A illustrates a user interface element (related to closing of a file) in a computer application when a user has entered a large amount of data in the application. FIG. 1B illustrates the same user interface element (related to closing of a file) when a user has entered relatively a small amount of data. It would be appreciated that in both the illustrations, irrespective of the amount of data entered by a user (and common underlying computer application), the representation as well as the interaction with the user interface element remains the same. The user interface element remains insensitive to the context of the interaction and completely ignores the criticality of the file closing option irrespective of the amount of data entered. The computer application merely prompts with the same user interface element having three buttons with equal importance and similar interaction behavior for all the buttons, thus making it equally likely for a user to select either the "No" button or the "Yes" button. In case a user wrongly selects the "No" button, he or she ends up losing valuable data. The present user interface elements, therefore, do not take into account the state of a computer application and the context of a user's interaction to adapt their behavior.

Figure 2A:
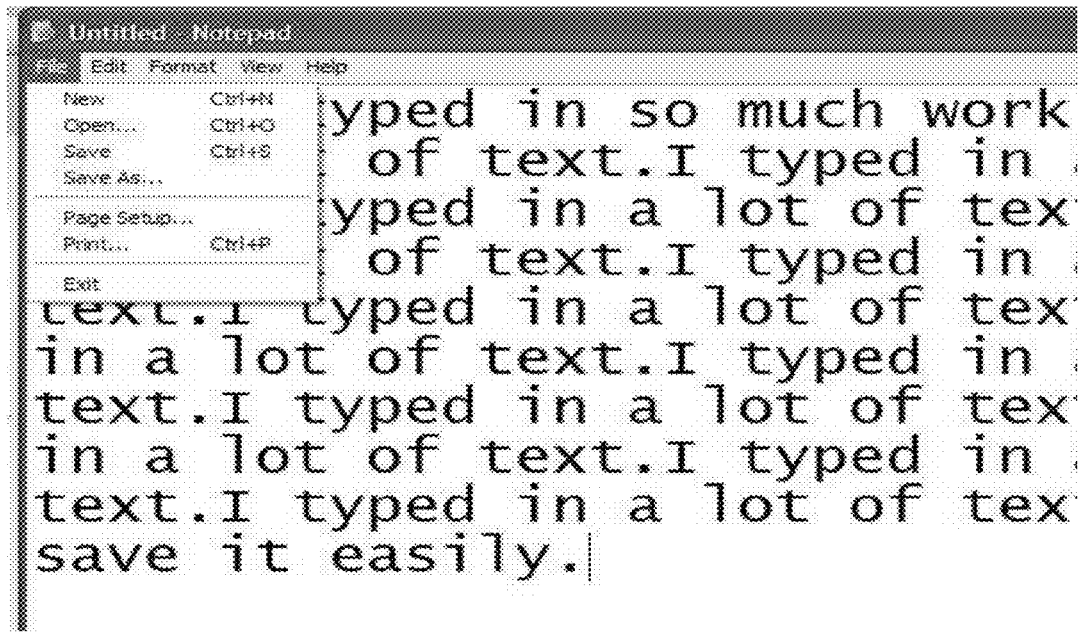
FIGS. 2A and 2B provides screenshots of a user interface element in a GUI-based computer application according to prior art.
Figure 2B:
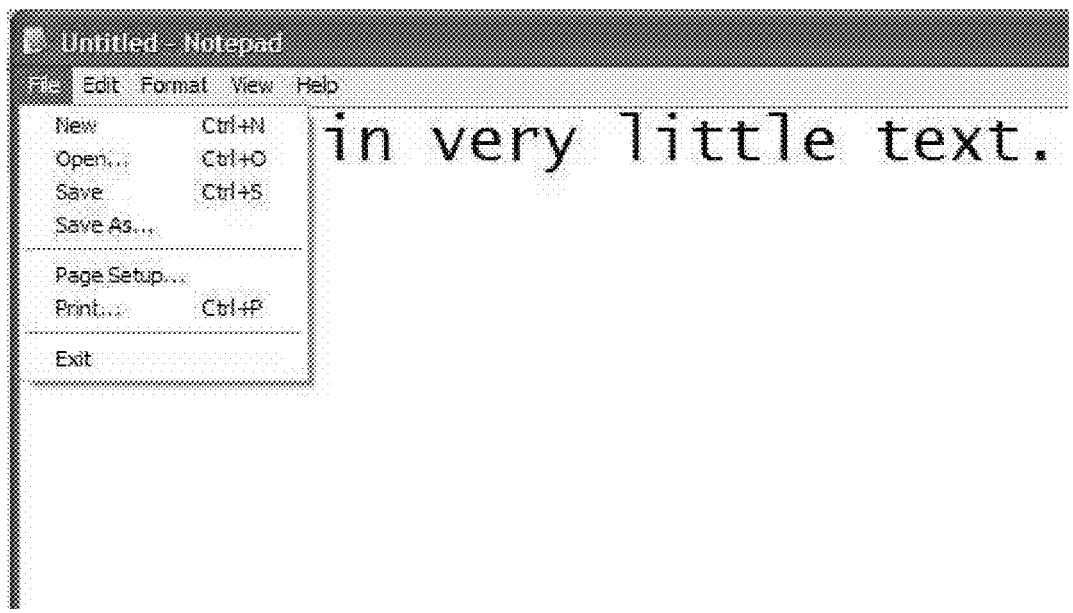

FIGS. 2A and 2B illustrate another example of the static nature of a user interface element. FIGS. 2A and 2B provides screenshots of a user interface element in a GUI-based computer application according to prior art. FIG. 2A illustrates a user interface element ("File" menu drop down list) in a computer application when a user has entered a large amount of data in the application. FIG. 1B illustrates the same user interface element ("File" menu drop down list) when a user has entered relatively a small amount of data. In both illustrations, when the user accesses "File" menu drop down list, all the options like "Open", "Save", "Save As" etc. are shown equally irrespective of the context of interaction (amount of data entered) with the underlying computer application.

Embodiments of the present invention provide a method of providing user interface elements which adapt their interaction behavior to attract user attention and adapt their appearance for simplifying user experience depending on the state of the application and context of user interaction.

The embodiments of the present invention provide methods, computer executable code and system for providing adaptable graphical user interface elements.

FIG. 3 shows a flow chart of a method 300 for protecting data according to an embodiment. The method 300 may be performed on a computer system (or a computer readable medium), such as, but not limited to, as illustrated in FIG. 6.

The method begins in step 310. In step 310, state of a computer application is identified. To illustrate, let's assume a user is working on a document in MS Word application. While working, the user may be entering data in the form of text or graphics, such as, charts, tables, pictures, diagram, etc. The user may also be in the process of inserting a hyperlink or another object in the document. Alternatively, the user may also be saving or closing a file. In all aforesaid situations, the computer application would be in a different state, i.e., it may be in the state of receiving text or graphics, opening or closing of a file, formatting of data, etc. The method step 310 involves identifying such different states of a computer application.

Identifying the state of a computer application also includes identifying a context of a user's interaction with the computer application. To illustrate, a user may spend ten minutes entering data in a computer application MS Notepad. Another, user may spend twenty minutes entering data in the same application. The method step 310 involves identifying such kind of a context of a user's interaction with a computer application. In the present example, identifying a context of the user's interaction with a computer application involves identifying duration of the user's interaction with the computer application.

To provide another illustration, a user may enter just a few sentences in a MS Notepad application. Another user may enter a few thousand words in the same computer application. In the present example, identifying a context of the user's interaction with a computer application involves identifying nature or type of the user's interaction (i.e. how many characters or words a user has entered) with the computer application.

To provide yet another illustration, a user may simultaneously be working on two different computer applications, for example, MS Excel and MS Power Point. The user may have entered a lot of data in a MS Excel document, but is yet to enter any thing in MS Power Point. In this case, the method step 310 would be able to identify and differentiate the contexts in which the two computer applications (MS Excel and MS Power Point) are being used. The method step 310 would recognize that although a user has entered a substantial amount of detail in an MS Excel document, he or she is yet to start working on a document in MS Power Point.

Once the method step 310 recognizes the state of a computer application and the context of a user's interaction with the computer application, the method proceed to step 320.

In step 320, the method adapts one or more user interface elements associated with a computer application based on the state of the computer application identified in step 310.

Most of the GUI-based computer applications have one or more user interface elements associated with each application. In the present day scenario, as explained above with reference to FIGS. 1A, 1B, 2A and 2B, the user interface elements associated with a computer application are static in nature. The behavior of a user interface element remains same irrespective of the state of a computer application.

The proposed method modifies a user interface element associated with a computer application based on the state of a computer application. In an embodiment, the method may adapt a user interface element by modifying its interaction behavior. To illustrate, a user interface button may be made sensible to the amount of time it is pressed. In this case, a user would be required to keep an onscreen button pressed for a little longer to emphasis and confirm his or her actions when the criticality of the action is higher. FIG. 4 illustrates this scenario. In this case, a user has entered a large amount of data in a computer application. Therefore, it is reasonable to assume that the data is critical or important to the user, and the user, in all probability, would like to save the data he or she has entered. In a prior art scenario, upon selection of a "File close" option, a user would be presented with a user interface element that provides three option buttons ("Yes", "No", and "Cancel") to a user. All three buttons are provided in a similar format with no variation amongst them that highlights the criticality of a user's action by inadvertently selecting any of them. For example, if a user presses the "No" option by mistake, all data entered by him or her would be lost. There is no mechanism, in the prior art scenario, which highlights to a user the criticality of his or her action.

The proposed method, however, recognizes this aspect. It identifies the context of a user's interaction (i.e. a large of amount of data has been entered in, therefore data may be critical to the user) and, at the time of "File close" option, modifies the user interface element, thereby highlighting the "Yes" button in relatively more detail than the other two options. In FIG. 4, the "Yes" button is highlighted with metal texture and 3-D to imply that selecting it is a high cost action. The metal texture and 3-D visualization represent the amount of data to be saved. At the same time the interaction behavior of the "Cancel" button is modified in such a way that it may be selected only if the button is pressed for a relatively longer duration.

The above illustrates an embodiment, wherein the proposed method modifies the interaction behavior of a user interface element by providing a time based input aspect to a user interface element.

Figure 5:
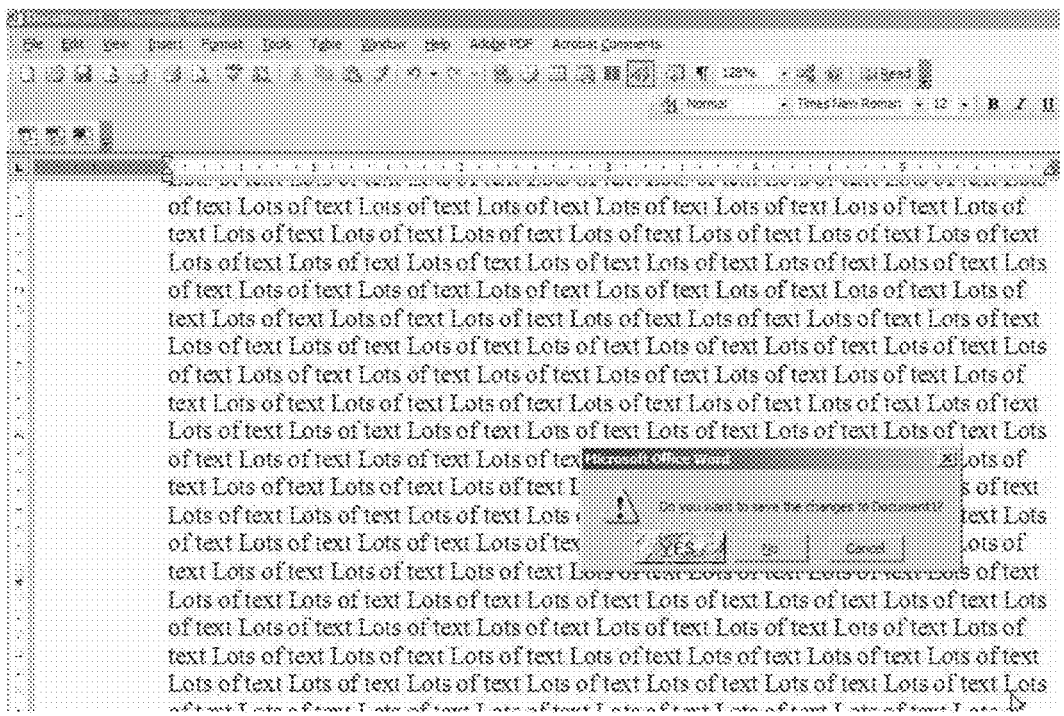
FIG. 5 is a screenshot of a user interface element in a GUI-based computer application according to an embodiment.

FIG. 5 provides another illustration of how the proposed method adapts a user interface element by modifying its interaction behavior. In this illustration also, a user has entered a large amount of data in a computer application. However, at the time of "File close" option, the method modifies the user interface element, and highlights the "Yes" button with stone texture thereby implying that selecting it is a high cost action. The stone texture represents the amount of data to be saved. At the same time the interaction behavior of the "Cancel" button is modified so that it may be selected only if there is an application of relatively more force or pressure on a mouse button. Therefore, in this embodiment, the user interface element is made more sensible to the pressure that is applied on a mouse button. In the present context, since there is a high cost involved (data may be irretrievably lost, if an incorrect selection is made), a user may be required to apply more pressure to press the button. This example, therefore, illustrates an embodiment, wherein the proposed method modifies the interaction behavior of a user interface element by providing a pressure based input aspect to a user interface element.

In another embodiment, the proposed method may adapt a user interface element by modifying its appearance.

The present day GUI user interface elements are static and do not adapt their appearance according to the context of interaction. For example, the shape and size of a "Close" button in a computer application remains constant independent of the amount of text entered into the application without saving it. Further, in existing computer applications, a drop down list contains GUI interface elements of the same size. For example the "File" menu drop down list contains GUI elements like "New", "Open", and "Close" etc. that remain constant independent of the application context. The proposed method, however, modifies the appearance of a user interface element by changing their shape, size, color, texture, etc. depending on the state of a computer application and the context of a user's interaction. To illustrate, in an embodiment, the size of a "Close" button may be decreased as the amount of unsaved data increases. In another embodiment, depending on the context, the size of "Save" GUI element in the "File" menu drop down list may be increased to reflect the fact that there is more unsaved data and the most relevant action to be performed now is saving the data.

In another embodiment, color based emphasis may be used to modify the appearance of a user interface element. Also, buttons may be color coded to indicate the cost of action involved in pressing that button.

In a still another embodiment, depth based emphasis may be used to modify the appearance of a user interface element. For example, buttons or links may change their visual depth based on the criticality of an action. A user may need to apply relatively higher pressure or a longer click to activate the interface element.

In a further embodiment, texture based emphasis may be used to modify the appearance of a user interface element. For example, buttons or links may change their texture based on the criticality of an action. If a critical action is involved (for example, data may be lost in case a file is closed inadvertently), the relevant user interface element ("Save" option button, in this case) may be presented in the form of a heavy material texture such as metal, indicating the criticality of an action. Likewise, in comparison, the interface elements that do not have a very highly critical actions associated with them may be presented in relatively less heavy texture, such as, cotton or foam.

It would be appreciated that the above provided modification or adaptation of user interface elements is for the purpose of illustration only, and a user interface element(s) may be modified in any form or manner.

In step 331, the method displays an adapted user interface element. Once a user interface element(s) has been modified, the modified element is rendered on a display, such as, of a computing or mobile device.

FIG. 6. shows a block diagram of a computer system 600 upon which an embodiment may be implemented. The computer system 600 includes a processor 610, a storage medium 620, a system memory 630, a monitor 640, a keyboard 650, a mouse 660, a network interface 620 and a video adapter 680. These components are coupled together through a system bus 690.

The storage medium 620 (such as a hard disk) stores a number of programs including an operating system, application programs and other program modules. A user may enter commands and information into the computer system 600 through input devices, such as a keyboard 650, a touch pad (not shown) and a mouse 660. The monitor 640 is used to display textual and graphical information.

An operating system runs on processor 610 and is used to coordinate and provide control of various components within personal computer system 600 in FIG. 6. Further, a computer program may be used on the computer system 600 to implement the various embodiments described above.

It would be appreciated that the hardware components depicted in FIG. 6 are for the purpose of illustration only and the actual components may vary depending on the computing device deployed for implementation of the present invention.

Further, the computer system 600 may be, for example, a desktop computer, a server computer, a laptop computer, or a wireless device such as a mobile phone, a personal digital assistant (PDA), a hand-held computer, etc.

The embodiment described provides a novel and effective way to simplify user interaction and make user interfaces intuitive. The adaptive user interfaces attract user attention depending on the cost of action and prevents a user from performing unintentional actions.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method, comprising:
identifying a state of a computer application;
in response to receiving a command from a user, identifying a context of a user interaction with the computer application, including determining an amount of data entered in the computer application by the user;
modifying a user interface element associated with the computer application format based on the identified state of the computer application and the determined amount of data entered in the computer application by the user,
wherein the user interface element includes a save option for the user to select to save the entered data and a decline option for the user to select to decline saving the entered data, and the modifying of the user interface element includes highlighting the save option if the determined amount of entered data is greater than a threshold, and highlighting the decline option if the determined amount of entered data is less than the threshold; and
displaying the modified user interface element.

2. The method according to claim 1, wherein identifying a context of the user interaction with the computer application further comprises determining a time duration of the user interaction with the computer application, and
wherein the modifying of the user interface element is further based on the time duration of the user interaction with the computer application.

3. The method according to claim 1, wherein identifying the context of the user interaction with the computer application further comprises identifying a type of interaction of the user with the computer application, and
wherein the modifying of the user interface element is further based on the type of interaction of the user with the computer application.

4. The method according to claim 1, wherein modifying the user interface element associated with the computer application comprises modifying an interaction behavior of the user interface element based on the determined amount of data entered in the computer application.

5. The method according to claim 4, wherein modifying the interaction behavior of the user interface element comprises increasing an amount of time a button on the user interface element is required to be pressed for the data entered in the computer application to be deleted.

6. The method according to claim 4, wherein modifying the interaction behavior of the user interface element comprises increasing an amount of pressure a button on the user interface element is required to be pressed for the data entered in the computer application to be deleted.

7. The method according to claim 1, wherein the modifying of the user interface element further comprises modifying a shape of the user interface element.

8. The method according to claim 1, wherein the modifying of the user interface element further comprises modifying a color of the user interface element.

9. The method according to claim 1, wherein the modifying of the user interface element further comprises modifying a size of the user interface element.

10. The method according to claim 1, wherein the modifying of the user interface element further comprises modifying a texture of the user interface element.

11. A system, comprising:
   a processor; and
   a memory coupled to the processor, wherein the memory includes instructions, which when executed by the processor cause the system to:
      identify a state of a computer application;
      in response to a command from a user, identify a context of a user interaction with the computer application, including determine an amount of data entered in the computer application by the user;
      modify a user interface element associated with the computer application based on the identified state of the computer application and the determined amount of data entered in the computer application by the user; and
      display the modified user interface element,
   wherein the user interface element includes a save option for the user to select to save the entered data and a decline option for the user to select to decline saving the entered data, and
   wherein to modify the user interface element, the instructions are to cause the system to highlight the save option if the determined amount of entered data is greater than a threshold, and highlight the decline option if the determined amount of entered data is less than the threshold.

12. A non-transitory computer readable medium to store machine readable instructions, which are executable by a processor to:
   identify a state of a computer application;
   in response to a command from a user, identify a context of a user interaction with the computer application, including determine an amount of data entered by the user in the computer application;
   modify a user interface element associated with the computer application based on the identified state of the computer application and the determined amount of data entered in the computer application by the user; and
   display the modified user interface element,
   wherein the user interface element includes a save option for the user to select to save the entered data and a decline option for the user to select to decline saving the entered data, and
   wherein to modify the user interface element, the machine readable instructions cause the processor is to highlight the save option if the determined amount of entered data is greater than a threshold, and highlight the decline option if the determined amount of entered data is less than the threshold.

13. The non-transitory computer readable medium according to claim 12, wherein to identify the context of the user interaction with the computer application, the machine readable instructions further cause the processor to
   determine a time duration of the user interaction with the computer application, and
   modify the user interface element based on the determined time duration of the user interaction with the computer application.

* * * * *

UNITED STATES PATENT AND TRADEMARK OFFICE
CERTIFICATE OF CORRECTION

PATENT NO. : 8,656,305 B2
APPLICATION NO. : 12/782724
DATED : February 18, 2014
INVENTOR(S) : Dinesh Mandalapu et al.

It is certified that error appears in the above-identified patent and that said Letters Patent is hereby corrected as shown below:

In the Claims

In column 6, line 28, in Claim 1, before "based" delete "format".

Signed and Sealed this
Sixteenth Day of September, 2014

Michelle K. Lee
*Deputy Director of the United States Patent and Trademark Office*